United States Patent
Mimata et al.

(10) Patent No.: US 9,798,661 B2
(45) Date of Patent: Oct. 24, 2017

(54) STORAGE SYSTEM AND CACHE CONTROL METHOD

(71) Applicant: Hitachi, Ltd., Chiyoda-ku, Tokyo (JP)

(72) Inventors: Yoshifumi Mimata, Tokyo (JP); Yuko Matsui, Tokyo (JP); Shintaro Kudo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 128 days.

(21) Appl. No.: 14/766,911

(22) PCT Filed: Oct. 15, 2013

(86) PCT No.: PCT/JP2013/077972
§ 371 (c)(1),
(2) Date: Aug. 10, 2015

(87) PCT Pub. No.: WO2015/056301
PCT Pub. Date: Apr. 23, 2015

(65) Prior Publication Data
US 2016/0019145 A1    Jan. 21, 2016

(51) Int. Cl.
*G06F 12/08* (2016.01)
*G06F 3/06* (2006.01)
(Continued)

(52) U.S. Cl.
CPC .......... *G06F 12/0802* (2013.01); *G06F 3/06* (2013.01); *G06F 3/0613* (2013.01);
(Continued)

(58) Field of Classification Search
CPC ........ G06F 3/06; G06F 3/0613; G06F 3/0659; G06F 3/0683; G06F 12/0802; G06F 12/0868; G06F 2212/50
See application file for complete search history.

(56) References Cited

U.S. PATENT DOCUMENTS 5,819,054 A    10/1998 Ninomiya et al.
6,591,335 B1 *  7/2003 Sade .................. G06F 11/1666
                                                    711/113
(Continued)

FOREIGN PATENT DOCUMENTS

EP    1936487 A2    6/2008
JP    9-146842 A    6/1997
(Continued)

OTHER PUBLICATIONS

PCT International Search Report on application PCT/JP2013/077972 dated Dec. 24, 2013; 4 pages.
(Continued)

*Primary Examiner* — Reginald Bragdon
*Assistant Examiner* — Mehdi Namazi
(74) *Attorney, Agent, or Firm* — Foley & Lardner LLP

(57) ABSTRACT

A receiving controller which receives a read request out of first and second storage controllers transfers the read request to an associated controller which is associated with a read source storage area out of the first and second storage controllers when the receiving controller is not the associated controller. It is however the receiving controller that reads the read-target data from a read source storage device, writes the read-target data to a cache memory of the receiving controller, and transmits the read-target data written in the cache memory of the receiving controller to a host apparatus.

11 Claims, 14 Drawing Sheets

(51) Int. Cl.
*G06F 12/0802* (2016.01)
*G06F 12/0868* (2016.01)

(52) U.S. Cl.
CPC .......... *G06F 3/0659* (2013.01); *G06F 3/0683* (2013.01); *G06F 12/0868* (2013.01); *G06F 2212/50* (2013.01)

(56) References Cited

U.S. PATENT DOCUMENTS

| | | | |
|---|---|---|---|
| 2003/0002492 A1* | 1/2003 | Gallagher | H04L 69/329 370/360 |
| 2005/0114608 A1* | 5/2005 | Oshima | G06F 12/0862 711/137 |
| 2008/0126581 A1 | 5/2008 | Komikado et al. | |
| 2008/0126844 A1* | 5/2008 | Morita | G06F 11/2094 714/6.22 |
| 2010/0077106 A1 | 3/2010 | Komikado et al. | |
| 2014/0108727 A1* | 4/2014 | Sakashita | G06F 12/0862 711/118 |

FOREIGN PATENT DOCUMENTS

| | | |
|---|---|---|
| JP | 11-312058 A | 11/1999 |
| JP | 3264465 B2 | 12/2001 |
| JP | 2008-134775 A | 6/2008 |

OTHER PUBLICATIONS

Translation of Box V and Supplemental Box of PCT Written Opinion on application PCT/JP2013/077972 dated Dec. 24, 2013.

* cited by examiner

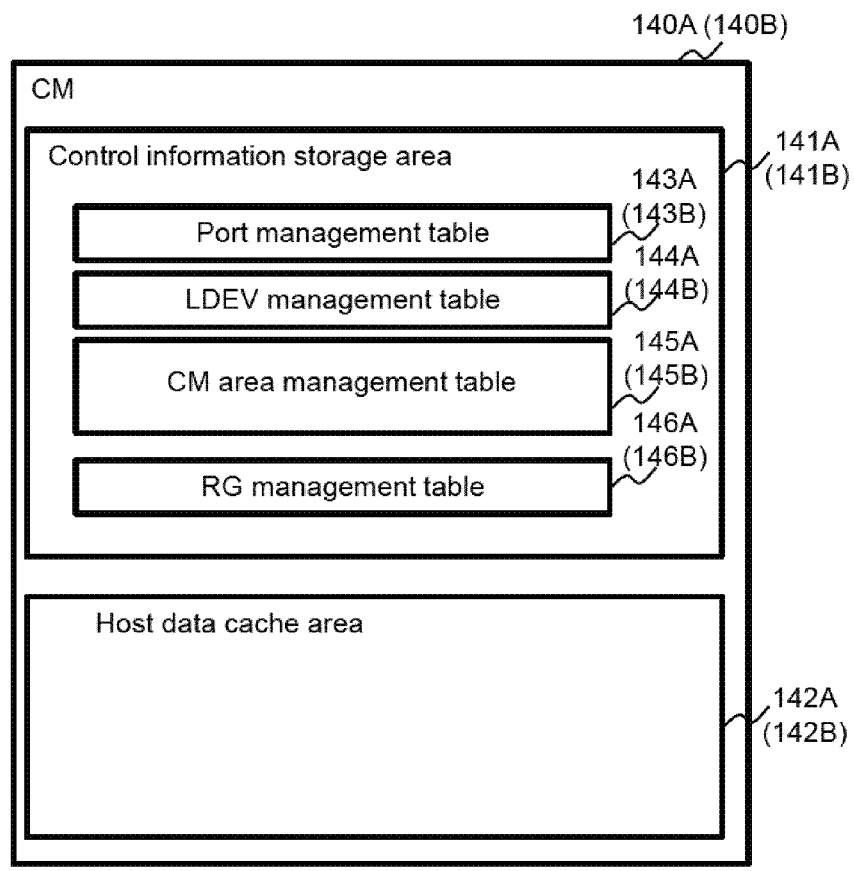

Fig. 6

RG management table 146A (146B)

| RG number (601A/601B) | RAID level (602A/602B) | Disk ID (603A/603B) |
|---|---|---|
| 0 | RAID5 | 0,1,2 |
| 1 | RAID6 | 3,4,5,6 |
| ... | ... | ... |

Fig. 7

LDEV management table 144A (144B)

| LDEV number (701A/701B) | Capacity (702A/702B) | Associated CTL number (703A/703B) | CM hit rate (704A/704B) | RG number (705A/705B) |
|---|---|---|---|---|
| 0 | 100GB | 0 | 20% | 0 |
| 1 | 200GB | 1 | 0% | 1 |
| 2 | 100GB | 0 | 15% | 0 |
| ... | ... | ... | ... | ... |

CM area management table  145A (145B)

| LDEV number | LDEV address | Capacity | Corresponding CTL number | CM address |
|---|---|---|---|---|
| 0 | 0x00000000 | 8MB | 0 | 0x00020000 |
| 0 | 0x00004000 | 2MB | 1 | 0x00042000 |
| 1 | 0x00000000 | 16KB | 0 | 0x00026000 |
| ... | ... | ... | ... | ... |

I/O information storage table 139A (139B)

| LDEV number 1101A (1101B) | Request serial number 1102A (1102B) | Request type 1103A (1103B) | Request LBA 1104A (1104B) | Request length 1105A (1105B) | Receiving CTL number 1106A (1106B) |
|---|---|---|---|---|---|
| 0 | 0 | Read | 0x0000 | 0x20 | 0 |
|   | 1 | Read | 0x0020 | 0x20 | 0 |
|   | 2 | Write | 0x340 | 0x10 | 1 |
| 1 | 0 | Write | 0x0010 | 0x10 | 0 |
|   | 1 | Read | 0x0200 | 0x40 | 0 |
| ... | ... | ... | ... | ... | ... |

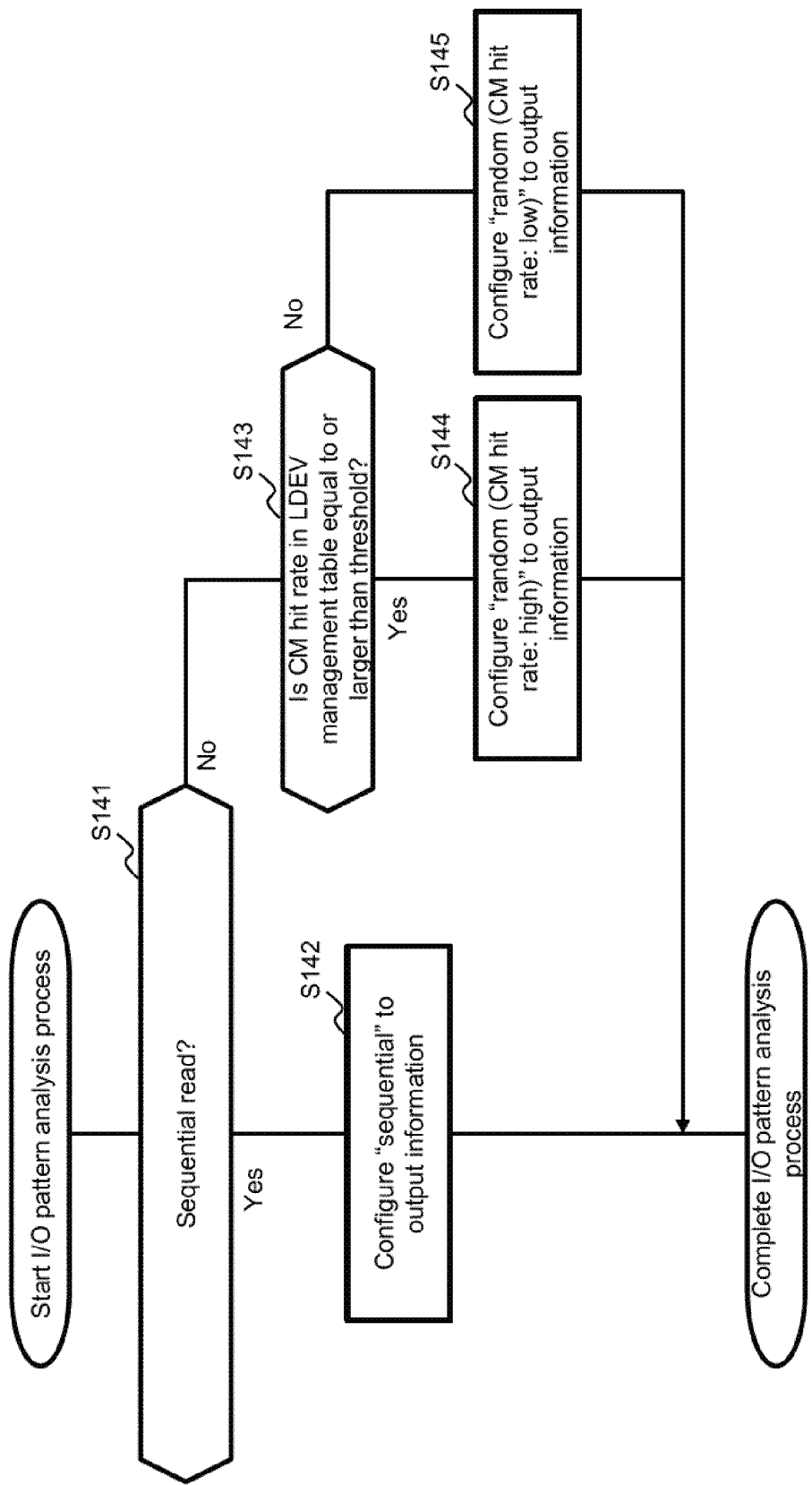

STORAGE SYSTEM AND CACHE CONTROL METHOD

TECHNICAL FIELD

The present invention generally relates to storage control and, for example, to caching data that is read from a storage device.

BACKGROUND ART

In general, a storage system is configured to cache data (host data) being read from a storage device such as an HDD (Hard Disk Drive) or an SSD (Solid State Drive) into a cache memory (CM) in order to expedite a response to a read request from a host computer so that, when a read request targeting the identical host data to be read is received thereafter, the host data on the CM can be returned to the host computer without accessing the storage device.

The storage system includes a controller which controls access to the storage device and is redundant in general. Such storage system secures as much area as possible by using a plurality of CMs included in a plurality of controllers as the cache for the host data, whereby a hit rate (CM hit rate) of the host data can be increased.

In such case where the plurality of CMs in the plurality of controllers is used, it is required that the plurality of controllers share information (hereinafter referred to as cache management information) indicating correspondence between the CM and a storage destination of data on the CM (such as an assigned number, an address, and a data size of a logical volume (LDEV)). There is known a method in which the cache management information is synchronized among the plurality of controllers by using a shared memory (see PTL 1, for example).

CITATION LIST

Patent Literature

[PTL 1] Japanese Patent No. 3264465

SUMMARY OF INVENTION

Technical Problem

In the case where the host data is cached by using the plurality of CMs in the plurality of controllers, a controller (receiving controller) which receives an I/O (Input/Output) request from the host computer is sometimes different from a controller (cache controller) which includes the CM in which the host data is stored, for example. In this case, when the I/O request is a read request, the cache controller reads the host data from the storage device and stores the host data in the CM of the cache controller, and the host data needs to be transferred from the CM of the cache controller to the CM of the receiving controller in order for the host data to be transmitted from the receiving controller to the host computer. This causes the host data to pass the memory for a number of times and thus causes large overhead.

Solution to Problem

The storage system is configured to receive the read request from a host apparatus, read read-target data according to the read request from a read source storage area, and transmit the read-target data to the host apparatus, the read request being a request to read the data from the read source storage area out of a plurality of storage areas. The "storage area" in this paragraph may be a logical storage device (such as an LDEV to be described later) or an area of a plurality of areas included in the logical storage device.

The storage system includes a first storage controller having a first cache memory and a second storage controller having a second cache memory. Each of the first and second storage controllers is configured to be able to receive the read request from the host apparatus. When the receiving controller which receives the read request out of the first and second storage controllers is not an associated controller which is associated with the read source storage area out of the first and second storage controllers, the receiving controller transfers the read request to the associated controller. It is however the receiving controller that reads the read-target data from the storage device corresponding to the read source storage area, writes the read-target data to the cache memory of the receiving controller, and transmits the read-target data written in the cache memory of the receiving controller to the host apparatus. The "storage device" may be a physical storage device, an RAID (Redundant Array of Independent (or Inexpensive) Disks) group configured by a plurality of physical storage devices, each of the physical storage devices configuring the RAID group, or a logical storage device provided from an external storage system.

Advantageous Effects of Invention

There can be avoided a case where the read-target data is transferred between the storage controllers even when the receiving controller is different from the associated controller.

BRIEF DESCRIPTION OF DRAWINGS

FIG. 4 is a diagram illustrating a configuration of a CM according to an embodiment.
FIG. 5 is a configuration diagram of an example of a port management table according to an embodiment.
FIG. 6 is a configuration diagram of an example of an RG management table according to an embodiment.
FIG. 7 is a configuration diagram of an example of an LDEV management table according to an embodiment.
FIG. 11 is a configuration diagram of an example of an I/O information storage table according to an embodiment.

FIG. 16 is a flowchart of an I/O pattern analysis process according to an embodiment.

DESCRIPTION OF EMBODIMENTS

Figure 1A:
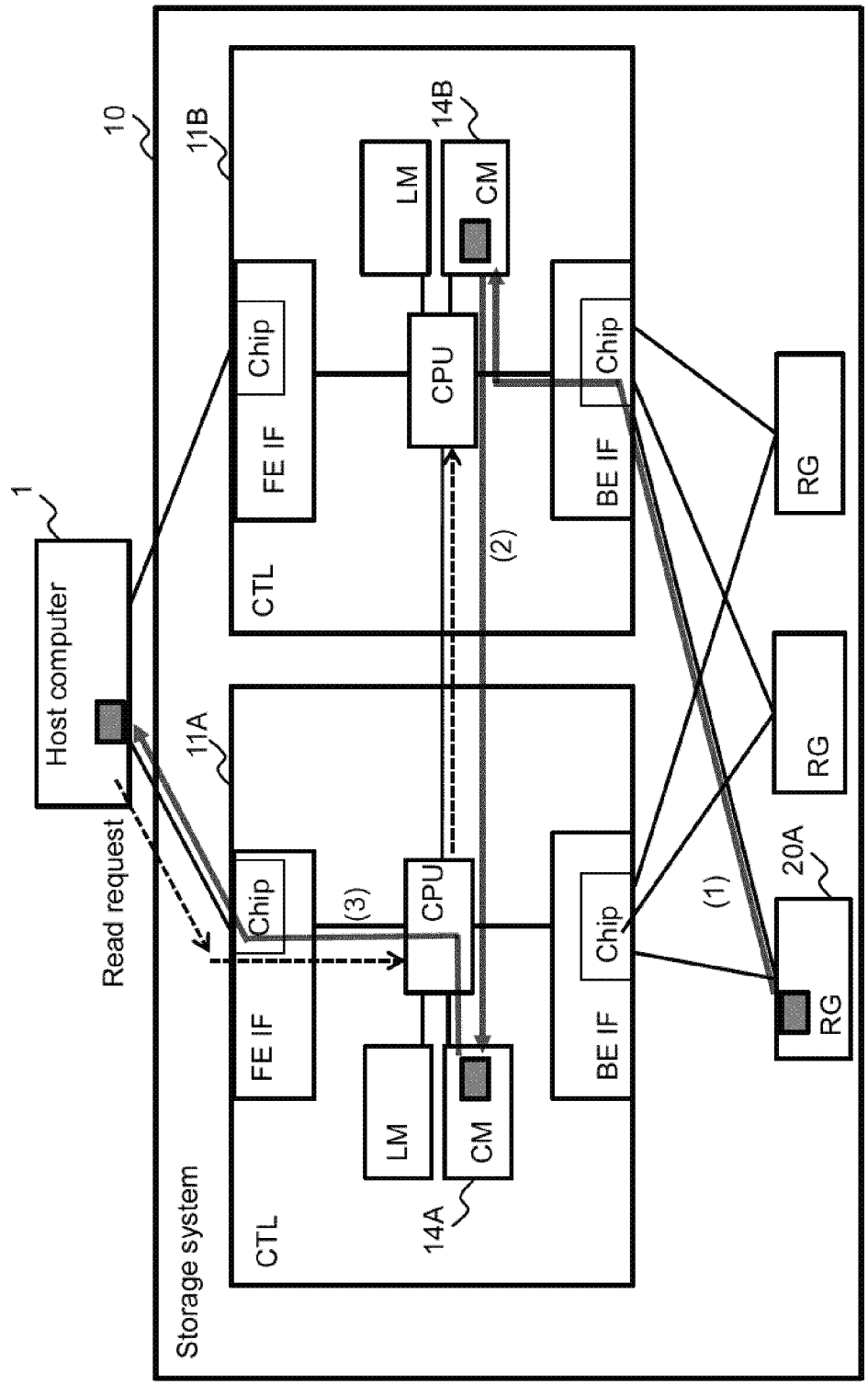
FIG. 1A is a diagram illustrating an overview of a read process according to a comparative example.

An embodiment will be described with reference to the drawings.

Note that while some information is described by the expression such as an "aaa table" in the following description, these information may also be expressed in a form other than the data structure such as the table. The "aaa table" or the like is therefore referred to as "aaa information" in some cases in order to indicate that the information does not depend on the data structure. Moreover, the expression such as an "ID" or a "number" is used in describing the content of each information, but identification information of another kind may also be used in place of or in addition to the aforementioned expressions.

While a process is sometimes described with a program as a subject in the following description, the subject of the process may also be a processor (such as a CPU (Central Processing Unit)) since the program is executed by the processor to perform a predetermined process with use of a storage resource (such as a memory) and/or a communication interface as appropriate. The process described with the program as the subject may also be a process performed by a controller including the processor. There may also be included a hardware circuit that performs a part or all of the process performed by the processor. A computer program may be installed from a program source to an apparatus. The program source may be a program distribution server or a storage medium that can be read by a computer, for example.

Moreover, in the following description, a reference numeral of a component is used to distinguish components of the same kind (such as CPU 160A and CPU 160B), while only a common part of the reference numeral of the component is used when the components of the same kind are not to be distinguished (such as CPU 160).

Furthermore, terms used in the following description have meanings as follows.

A "disk" is an abbreviation for a disk storage device. The disk is an example of a physical storage device, where a physical storage device of another kind may be adopted in place of or in addition to the disk.

A "CM" is an abbreviation for a cache memory. An "LM" is an abbreviation for a local memory.

An "RG" is an abbreviation for an RAID group. The RG (sometimes referred to as a parity group) is configured by a plurality of disks to be able to store data at a predetermined RAID level.

A "CTL" indicates a storage controller included in a storage system.

An "LDEV" is an abbreviation for a logical storage device and may also be referred to as a logical volume. The LDEV is a tangible LDEV in the following embodiment but may also be a virtual LDEV. The tangible LDEV is an LDEV based on a physical storage resource (such as the RG). The virtual LDEV may be an externally-coupled LDEV that is based on a storage resource (such as an LDEV) of an external storage system and pursuant to storage virtualization technology, or an LDEV that is configured by a plurality of virtual pages (virtual storage areas) and pursuant to capacity virtualization technology (typically Thin Provisioning).

An overview of a computer system according to an embodiment will be described first.

FIG. 1A is a diagram illustrating an overview of a read process according to a comparative example. A dashed-line arrow indicates the flow of a read request, while a solid-line arrow indicates the flow of host data (data being read in response to the read request).

A storage system 10 includes dual redundant CTLs, namely, CTLs 11A and 11B. The CTLs 11A and 11B provide a plurality of LDEVs to one or a plurality of host computers 1. An associated CTL is determined for each LDEV. The associated CTL of the LDEV processes an I/O request designating the LDEV.

It is now assumed that the CTL 11A is a receiving CTL, namely, a CTL which receives a read request from the host computer 1 and that the CTL 11B is the associated CTL of an LDEV designated by the read request (a read source LDEV).

In this case, the receiving CTL 11A transfers the read request being received to the associated CTL 11B. The associated CTL 11B receives the read request from the receiving CTL 11A, reads the host data from an RG 20A on which a read source LDEV is based in accordance with the read request, and stores the host data being read into a CM 14B (FIG. 1A (i)). Subsequently, the associated CTL 11B transfers the host data stored in the CM 14B to the receiving CTL 11A so that the receiving CTL 11A stores the host data into a CM 14A (FIG. 1A (2)). The receiving CTL 11A then returns the host data stored in the CM 14A to a host computer 10 (FIG. 1 (3)).

According to this comparative example, the host data is transferred between the CTLs as illustrated in FIG. 1A (2) when the receiving CTL is different from the associated CTL.

The present embodiment can avoid transferring the host data between the CTLs even when the receiving CTL is different from the associated CTL.

Figure 1B:
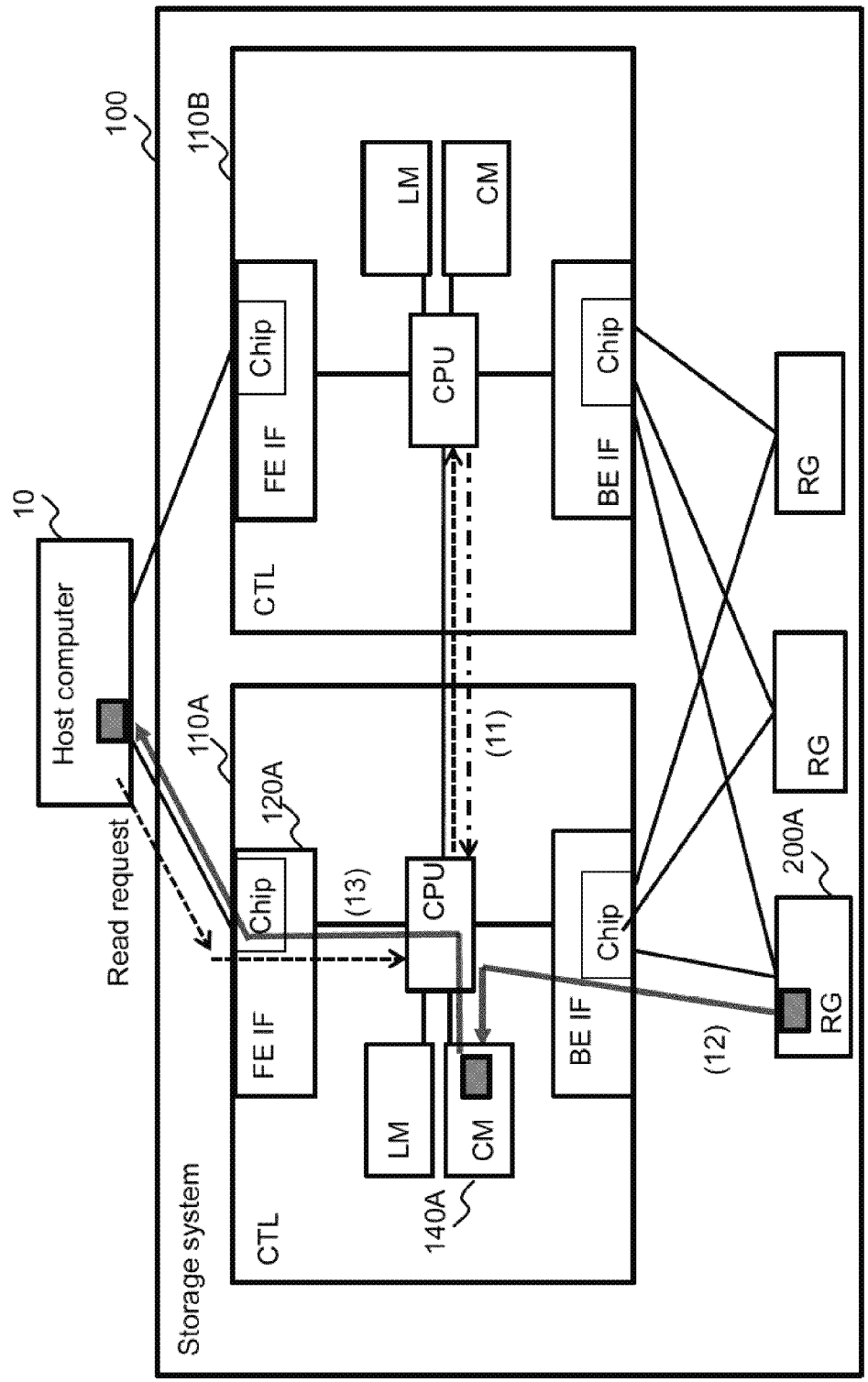
FIG. 1B is a diagram illustrating an overview of a read process according to an embodiment.

Specifically, as illustrated in FIG. 1B, an associated CTL 110B determines a receiving CTL 110A to be a CM-secured CTL (a CTL securing a CM area in which the host data is stored) and transmits a disk read command to the receiving CTL 110A (FIG. 1B (11)). The disk read command is a disk I/O command, the I/O type of which is read, and includes a disk ID (an ID of a read source disk), a disk address (an address of the read source disk), a CM address (an address of the CM area secured by the associated CTL 110B), and the like. The receiving CTL (CM-secured CTL) 110A receives the disk read command, reads the host data from an RG 200A in accordance with the disk read command, and stores the host data into a CM area (a CM area specified from the CM address in the disk read command) of a CM 140A (FIG. 1B (12). The receiving CTL 11A thereafter returns the host data stored in the CM 140A to a host computer 101 (FIG. 1B (13)).

The present embodiment can therefore avoid transferring the host data between the CTLs as described above even when the receiving CTL is different from the associated CTL. As a result, the overhead caused in the read request process can be reduced. Note that in FIG. 1B, the receiving CTL 110A upon receiving the read request may first determine whether or not the host data according to the read request is stored in the CM 140A before determining whether or not the associated CTL of the LDEV designated by the read request is the CTL 110A, and transmit the host data stored in the CM 140A to the host computer 101 when the outcome of the determination is true. Accordingly, there can be expected the omission of the determination on whether or not the associated CTL of the LDEV designated by the read request is the CTL 110A, the transfer of the read request from the receiving CTL to the associated CTL, and the transmission of the disk read command from the associated CTL to the receiving CTL.

The present embodiment will now be described in detail.

Figure 2:
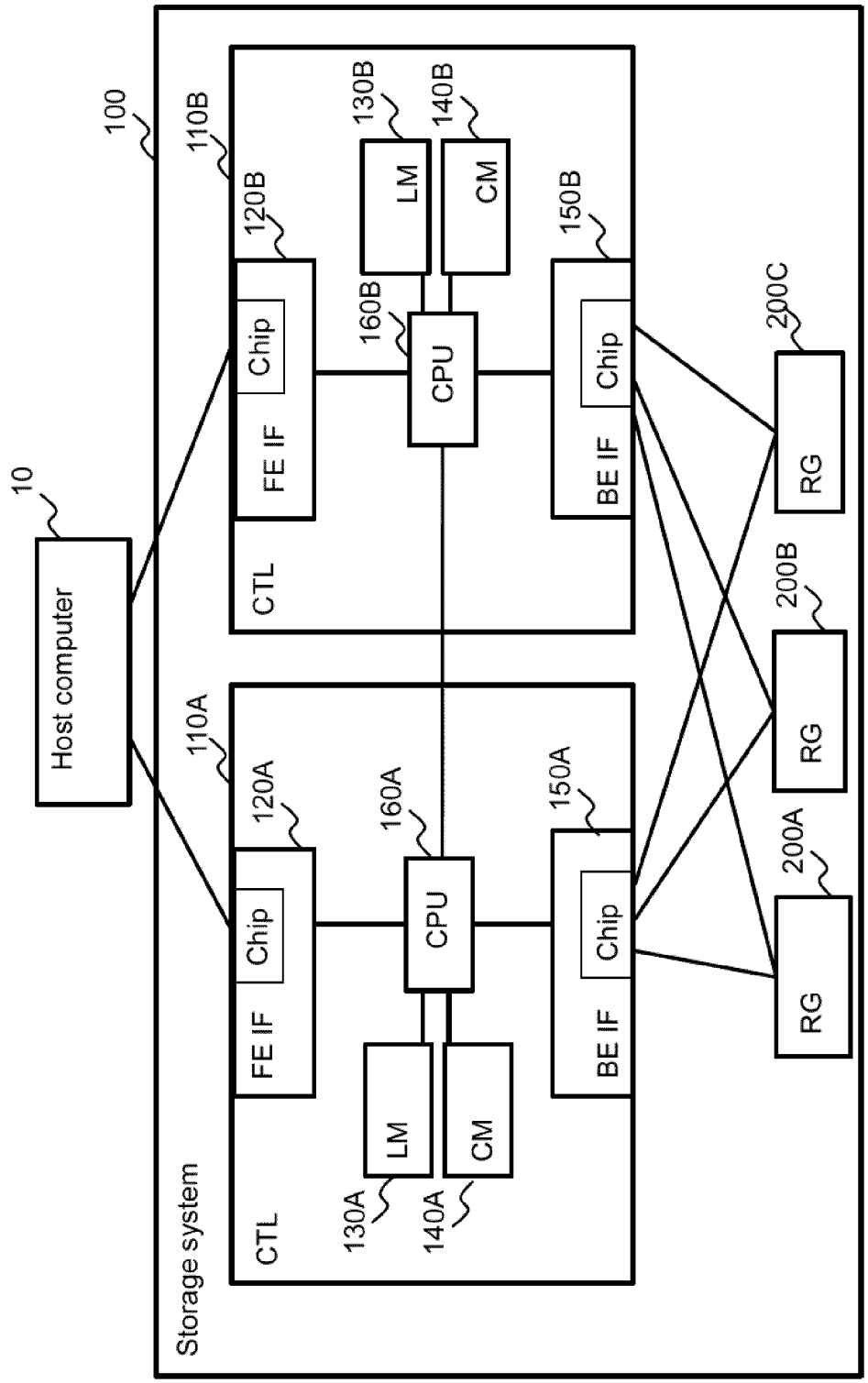
FIG. 2 is a block diagram of a computer system according to an embodiment.

FIG. 2 is a block diagram of a computer system according to the embodiment.

The computer system includes the host computer 10 and a storage system 100. The host computer 10 and the storage system 100 are coupled to each other via a communication network or the like to be able to communicate data with each other. Note that while one host computer 10 is provided in FIG. 2, there may be provided a plurality of host computers 10 as well.

The host computer 10 is an example of a host apparatus and is configured by a general-purpose server apparatus or the like to execute a predetermined process. The host computer 10 issues an I/O request to the storage system 100. The I/O request is an SCSI command, for example, and includes a request type (such as read or write), a port number and an LUN (Logical Unit Number) associated with an LDEV (logical unit) at an I/O destination, and an LBA (Logical Block Address) of an area at the I/O destination in the LDEV.

The storage system 100 includes a plurality of RGs 200 (200A to 200C) and the plurality of CTLs 110 (110A and 110B). Each of the CTLs 110A and 110B is coupled to each of the plurality of RGs 200. The RG 200 is configured by a plurality of disks. A plurality of LDEVs is configured on the basis of the plurality of RGs 200A to 200C in the present embodiment. The host data is stored in the LDEV, and the host data stored in the LDEV is stored in an RG on which the LDEV is based. Note that an associated CTL is determined for each LDEV in the present embodiment. The associated CTL of the LDEV is a CTL which processes an I/O request designating the LDEV as the I/O destination and can therefore be called a CTL having the ownership of the LDEV as well.

The CTL 110A and the CTL 110B are coupled to each other to be able to communicate with each other. In the drawing, a reference numeral ending with "A" is assigned to a component included in the CTL 110A, whereas a reference numeral ending with "B" is assigned to a component included in the CTL 110B. A common reference numeral may be used in the case where the component is not to be distinguished between the CTLs, as described above.

The CTL 110A (110B) includes an FE IF (front end interface) 120A (120B), an LM 130A (130B), the CM 140A (140B), a BE IF (back end interface) 150A (150B), and a CPU (Central Processing Unit) 160A (160B) coupled to these components.

The FE IF 120 is a communication interface device, includes a protocol chip, for example, and controls I/O to/from the host computer 10. The FE IF 120 includes one or a plurality of ports and can communicate with the host computer 10 through each port. The LM 130 stores a program executed by the CPU 160 and various pieces of information. The LM 130 in the present embodiment is configured by a memory, the access speed of which is faster than that of a memory configuring the CM 140. The CM 140 stores the host data, control information, and the like. The BE IF 150 is a communication interface device, includes a protocol chip, for example, and controls I/O to/from the RG 200. The BE IF 150 includes one or a plurality of ports and can communicate with the RG 200 through each port. The CPU 160 performs various processes by executing the program stored in the LM 130.

Figure 3:
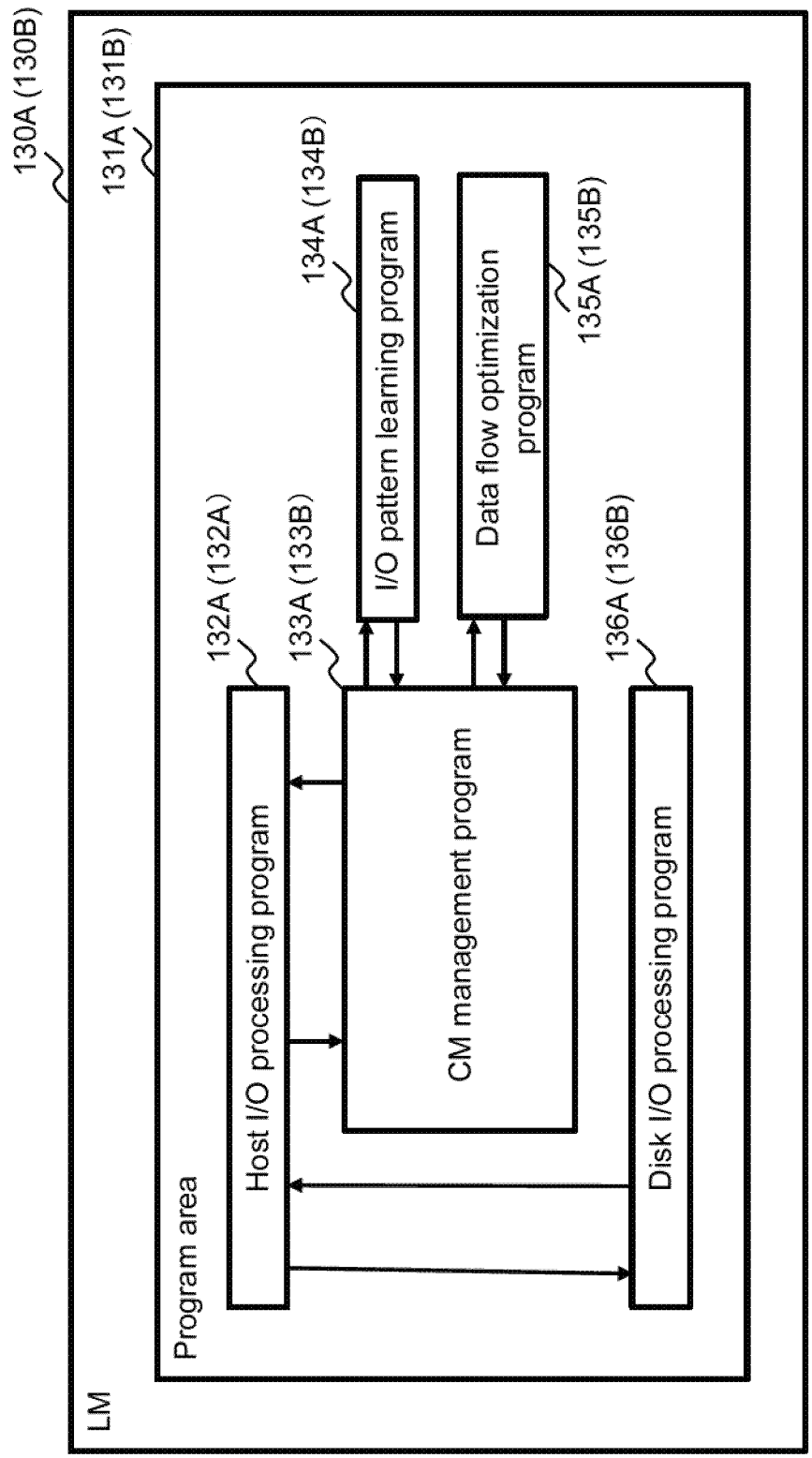
FIG. 3 is a diagram illustrating a configuration of a program in an LM according to an embodiment.

FIG. 3 is a diagram illustrating the configuration of a program stored in the LM 130.

The LM 130A (130B) includes a program area 131A (131B) in which a program is stored. Stored in the program area 131A (131B) are a host I/O processing program 132A (132B), a CM management program 133A (133B), an I/O pattern learning program 134A (134B), a data flow optimization program 135A (135B), and a disk I/O processing program 136A (136B).

The host I/O processing program 132 is a program that processes the I/O request received from the host computer 10. The CM management program 133 is a program that executes a process of managing the host data already stored in the CM 140, a process of managing a CM hit rate for each LDEV, and a process of performing CM hit determination. The I/O pattern learning program 134 is a program that performs a process of learning an I/O pattern for each LDEV and determining the I/O pattern. The I/O pattern in the present embodiment includes sequential read in which consecutive areas of the LDEV are read sequentially, and random read in which a random area of the LDEV is read. The random read further includes random read with a high CM hit rate and random read with a low CM hit rate. The data flow optimization program 135 is a program that determines the CM 140 in which the host data is to be cached in order to obtain a data flow that does not cause data to be transferred between the CTLs 110. The disk I/O processing program 136 is a program that executes I/O processing on each disk configuring the RG 200. Note that in the present embodiment, the CM hit rate of the LDEV may be a ratio of the number of read requests for which read-target data is stored in either one of the CMs 140A and 140B to the total number of read requests designating the LDEV as the read source. The total number of read requests may be the number of read requests received over a fixed period of time. Moreover, the CM hit rate of the LDEV is the CM hit rate pertaining to the read request, which may be the CM hit rate pertaining only to the read request or the CM hit rate pertaining to the I/O request.

FIG. 4 is a diagram illustrating the configuration of the CM 140.

The CM 140A (140B) includes a control information storage area 141A (141B) in which control information is stored and a host data cache area 142A (142B) into which the host data is cached. Stored in the control information storage area 141A (141B) are a port management table 143A (143B), an LDEV management table 144A (144B), a CM area management table 145A (145B), and an RG management table 146A (146B). The configuration of each table will be described later on.

FIG. 5 is a configuration diagram of an example of the port management table 143.

The port management table 143A (143B) is a table that manages the port of the FE IF 120A (120B) and includes an entry for each port. The entry includes a field corresponding to each of a port number 501A (501B), an LUN 502A (502B), an implemented CTL number 503A (503B), and an LDEV number 504A (504B).

A port number that uniquely identifies a port is stored under the port number 501. A LUN (Logical Unit Number) recognized by the host computer 10 is stored under the LUN 502. The LUN is associated with the LDEV. A number assigned to the CTL 110 onto which the port is implemented is stored under the implemented CTL number 503. A number assigned to the LDEV is stored under the LDEV number 504.

FIG. 6 is a configuration diagram of an example of the RG management table 146.

The RG management table 146A (146B) is a table that manages the RG and includes an entry for each RG. The entry includes a field corresponding to each of an RG number 601A (601B), an RAID level 602A (602B), and a disk ID 603A (603B).

A number assigned to the RG is stored under the RG number 601. An RAID level of the RG is stored under the RAID level 602. An ID of a disk configuring the RG is stored under the disk ID 603.

FIG. 7 is a configuration diagram of an example of the LDEV management table 144.

The LDEV management table 144A (144B) is a table that manages the LDEV and includes an entry for each LDEV. The entry includes a field corresponding to each of an LDEV number 701A (701B), a capacity 702A (702B), an associated CTL number 703A (703B), a CM hit rate 704A (704B), and an RG number 705A (705B).

The number assigned to the LDEV is stored under the LDEV number 701. Capacity of the LDEV is stored under the capacity 702. A number assigned to the associated CTL of the LDEV is stored under the associated CTL number 703. A cache hit rate (CM hit rate), or a rate of the host data that is targeted by the read request made to the LDEV and present in any CM 140, is stored under the CM hit rate 704. Note that the CM hit rate corresponds to a type of history information related to the read request. A number assigned to the RG on which the LDEV is based is stored under the RG number 705.

Figures 8, 9:
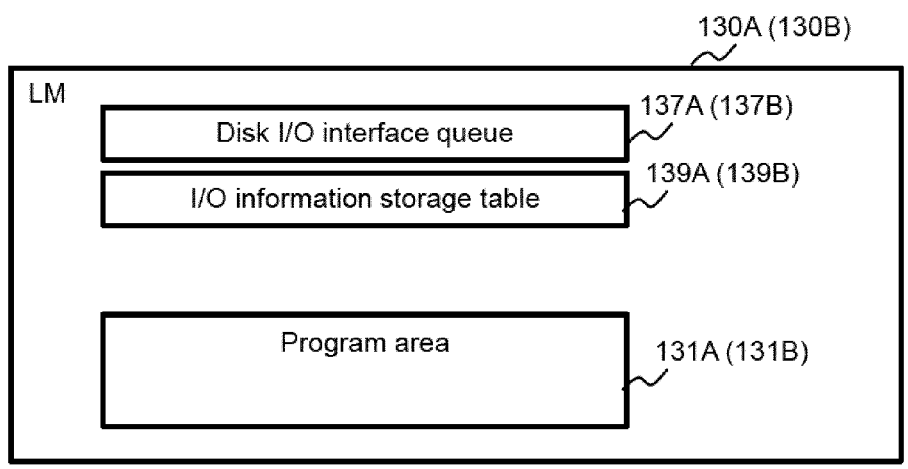
FIG. 8 is a configuration diagram of an example of a CM area management table according to an embodiment.
FIG. 9 is a diagram illustrating a configuration of a local memory according to an embodiment.

FIG. 8 is a configuration diagram of an example of the CM area management table 145.

The CM area management table 145A (145B) is a table that manages the host data stored in the CM 140A (140B) and includes an entry for each host data. The entry includes a field corresponding to each of an LDEV number 801A (801B), an LDEV address 802A (802B), a capacity 803A (803B), a corresponding CTL number 804A (804B), and a CM address 805A (805B).

The number assigned to the LDEV, in which the host data on the CM is stored, is stored under the LDEV number 801. A leading address of an LDEV area (an area in the LDEV) of the host data on the CM is stored under the LDEV address 802. Capacity (size) of the host data is stored under the capacity 803. A number assigned to the CTL 110 including the CM 140, in which the host data is stored, is stored under the corresponding CTL number 804. An address of a CM area (an area in the CM 140) in which the host data is stored is stored under the CM address 805. According to the topmost entry of the CM area management table 145, for example, one can see that 8 MB host data is cached from the address "0x00000000" of the LDEV having the LDEV number "0" to the area having the address that starts from "0x00020000" of the CM 140 included in the CTL 110 having the CTL number "0."

FIG. 9 is a diagram illustrating the configuration of the LM 130.

The LM 130A (130B) includes a program area 131A (131B), a disk I/O interface queue 137A (137B), and an I/O information storage table 139A (139B).

Figure 10:
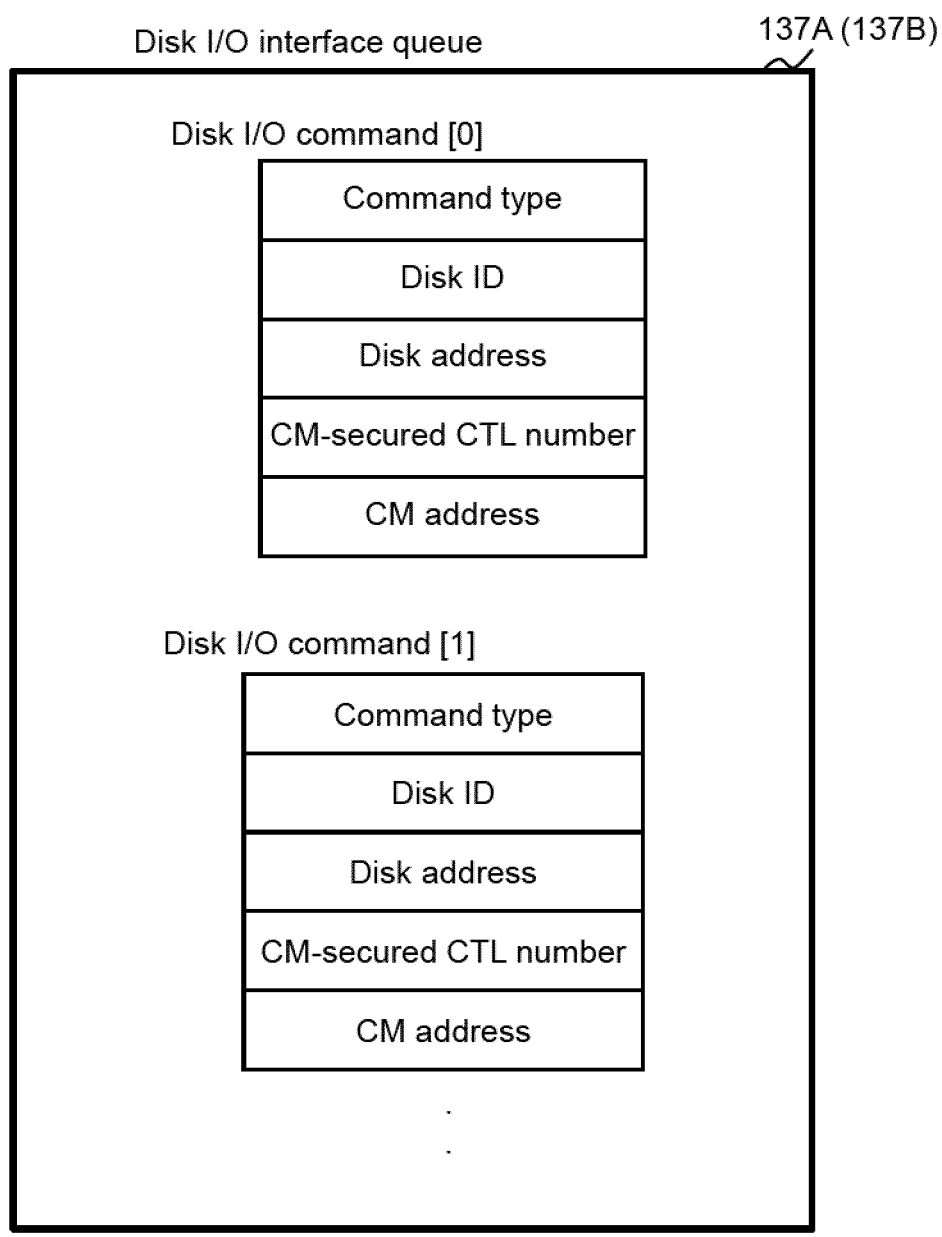
FIG. 10 is a configuration diagram of an example of a disk I/O interface queue according to an embodiment.

FIG. 10 is a configuration diagram of an example of the disk I/O interface queue 137.

The disk I/O interface queue 137A (137B) is a queue of a disk I/O command that is an I/O command to the disk in the RG 200. The disk I/O processing program 136 executes the I/O to/from the RG 200 in accordance with the disk I/O command. The disk I/O command includes a field corresponding to each of a command type, a disk ID, a disk address, a CM-secured CTL number, and a CM address. A type of the disk I/O command (such as read or write) is stored under the command type. An ID of a transmission destination disk of the disk I/O command is stored under the disk ID. An address of an I/O destination (an address of the disk) according to the disk I/O command is stored under the disk address. A number assigned to a CM-secured CTL, or a number assigned to the CTL 110 which reads the host data from the disk and caches the data, is stored under the CM-secured CTL number. An address of a cache destination area for the host data is stored under the CM address.

FIG. 11 is a configuration diagram of an example of the I/O information storage table 139.

The I/O information storage table 139A (139B) is a table that stores history information pertaining to the I/O request made to the LDEV associated with the CTL 110A (110B). The I/O information storage table 139A (139B) includes an entry for each I/O request. The entry includes a field corresponding to each of an LDEV number 1101A (1101B), a request serial number 1102A (1102B), a request type 1103A (1103B), a request LBA 1104A (1104B), a request length 1105A (1105B), and a receiving CTL number 1106A (1106B).

The number assigned to the LDEV associated with the CTL 110 (such as 110A) is stored under the LDEV number 1101 (such as 1101A). A serial number of the I/O request is stored under the request serial number 1102. A type of the I/O request is stored under the request type 1103. An LBA (LBA of the I/O destination area in the LDEV) designated by the I/O request is stored under the request LBA 1104. Capacity (length) of the host data input/output according to the I/O request is stored under the request length 1105. A number assigned to the receiving CTL, or a number assigned to the CTL 110 which receives the I/O request from the host computer, is stored under the receiving CTL number 1106.

Note that the I/O information storage table 139 may store the history of only a predetermined number of the most recent I/O requests (such as three requests) for each LDEV. When a new I/O request is received for the LDEV, the history of the predetermined number of I/O requests to which is managed, the information of the entry corresponding to the oldest I/O request to the LDEV may be deleted. The size of the I/O information storage table 139 can be controlled as a result.

A process performed in the present embodiment will now be described.

Figure 12:
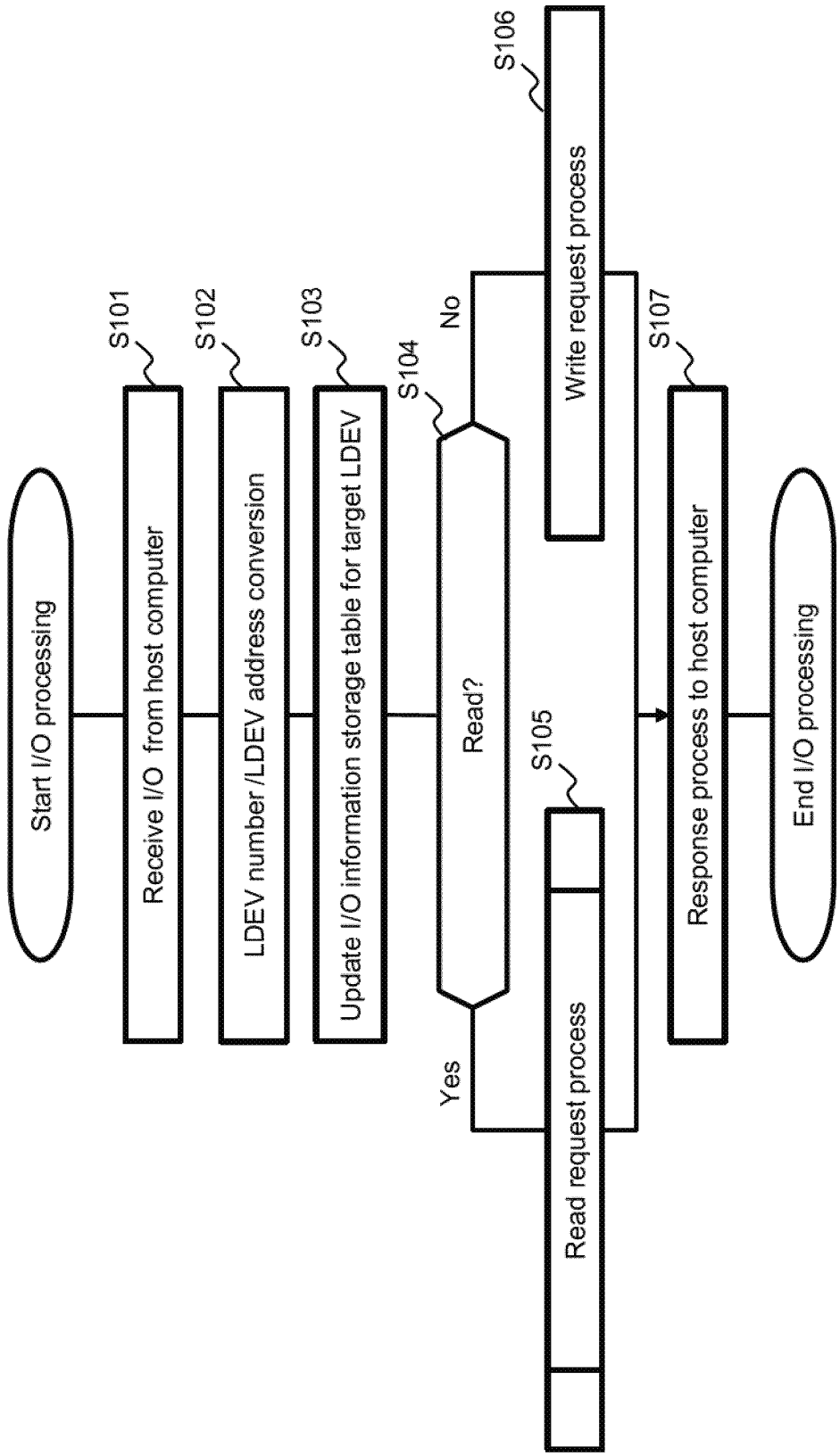
FIG. 12 is a flowchart of I/O processing according to an embodiment.

FIG. 12 is a flowchart of the I/O processing.

The host I/O processing program 132 of any CTL 110 receives an I/O request (a read request or a write request) from the host computer 10 (S101). The receiving CTL which receives the I/O request from the host computer 10 hereinafter corresponds to the CTL 110A in FIGS. 12 to 18.

The host I/O processing program 132A of the receiving CTL 110A then finds the LDEV number and the LDEV address from I/O destination information designated by the I/O request being received (S102). Specifically, the host I/O processing program 132A refers to the port management table 143 to specify the LDEV number and the implemented CTL number corresponding to the port number and the LUN in the I/O destination information designated by the I/O request, and converts the LBA in the I/O destination information into the LDEV address. Note that the host I/O processing program 132A transfers the I/O request being received to the CTL 110B when the specified LDEV number does not correspond to the LDEV associated with the receiving CTL 110A. In this case, the I/O processing program 132B of the CTL 110B performs a process similar to that in S102 on the I/O request transferred from the receiving CTL 110A. It is hereinafter assumed in FIGS. 12 to 18 that the associated CTL of the I/O destination LDEV according to the I/O request is the CTL 110B, the I/O request is thus transferred from the receiving CTL 110A to the associated CTL 110B, the host I/O processing program 132B performs the process in S102 on the I/O request, and the CTL 110B is acknowledged to be associated with the I/O destination LDEV according to the I/O request.

Next, the host I/O processing program 132B adds an entry corresponding to the specified LDEV number to the I/O information storage table 139 and stores information corresponding to each field of the entry into the table (S103). Specifically, the host I/O processing program 132B configures a value obtained by adding "1" to the largest number currently registered as the request serial number of the I/O destination LDEV under the request serial number 1102B of the added entry, configures the type of the I/O request under the request type 1103B, configures the LBA in the I/O request under the request LBA 1104B, configures the length of I/O target data according to the I/O request under the request length 1105B, and configures the implemented CTL number (that is the number assigned to the receiving CTL 110A) specified in S102 under the receiving CTL number 1106B.

The host I/O processing program 132B then determines whether or not the I/O request being received is the read request (S104).

When the outcome of the determination in S104 is true (S104: Yes), the host I/O processing program 132B executes the read request process (see FIG. 13) (S105) and thereafter proceeds to a process in S107.

When the outcome of the determination in S104 is false (S104: No), on the other hand, the host I/O processing program 132B performs a write request process of writing the host data according to a write request into the CM 140B (S106), and proceeds to the process in S107. Note that the host data in the CM 140B is written into the RG 200, on which a write destination LDEV is based, by the disk I/O processing program 136B.

In S107, the host I/O processing program 132B notifies the receiving CTL 110A of the completion of the process performed on the I/O request so that, in response to the notification, the host I/O processing program 132A of the receiving CTL 110A returns a response to the I/O request to the host computer 10 transmitting the I/O request. The response to the I/O request includes the read-target host data when the I/O request is the read request. The read-target host data is stored in the CM 140A of the receiving CTL 110A in the read request process (S105). As a result, in S107, the I/O processing program 132A reads the host data from the CM 140A and returns a response including the host data to the host computer 10.

Figure 13:
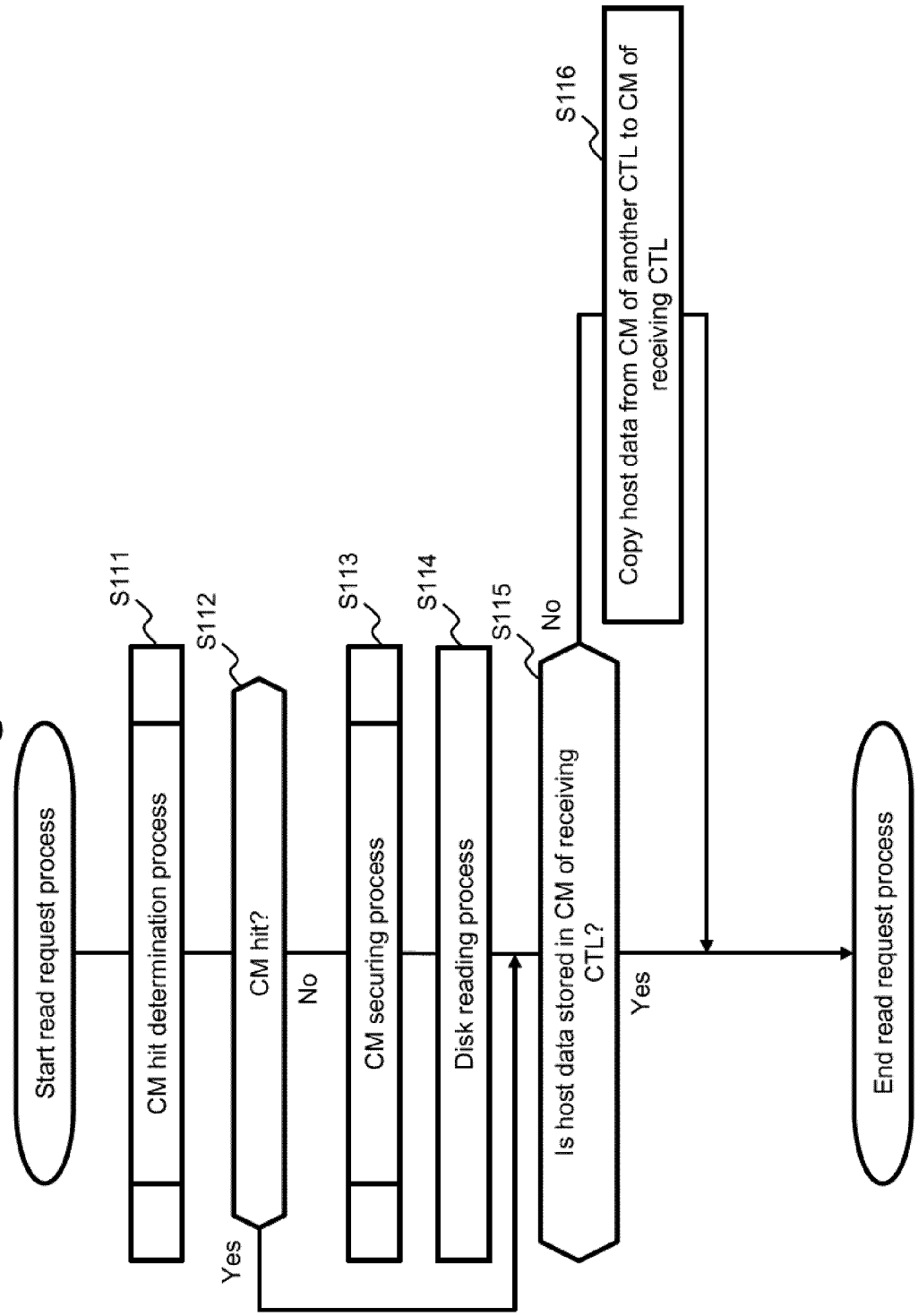
FIG. 13 is a flowchart of a read request process according to an embodiment.

FIG. 13 is a flowchart of the read request process (S105 in FIG. 12).

The host I/O processing program 132B calls the CM management program 133B, which then executes the CM hit determination process (see FIG. 14) (S111). At this time, the host I/O processing program 132B passes to the CM management program 133B the LDEV number of a read source area, the LDEV address and the length of the read request as an argument.

Subsequently, the host I/O processing program 132B receives output information of the CM hit determination process from the CM management program 133B and determines whether or not there is CM hit, that is, whether or not the read-target host data is stored in any one of the CMs 140A and 140B (S112). When the outcome in S112 is true (S112: Yes), the host I/O processing program 132B proceeds to a process in S115.

When the outcome of the determination in S112 is false (S112: No), on the other hand, the host I/O processing program 132B adds a disk I/O command corresponding to the read request targeted for processing to the disk I/O interface queue 137B, configures an information element corresponding to the read request targeted for processing to the disk I/O command, and calls the CM management program 133B, which then executes the CM securing process (see FIG. 15) (S113). Here, the process of configuring the information element corresponding to the read request targeted for processing to the disk I/O command is specifically executed as follows. That is, the host I/O processing program 132B refers to the LDEV management table 144B to specify the RG number corresponding to the LDEV number found in S102, refers to the RG management table 146 to specify the RAID level and the disk ID corresponding to the specified RG number, and specifies a disk ID of a disk having a physical area corresponding to the LDEV address and an address within the disk on the basis of the LDEV address found in S102, the specified RAID level, and the specified disk ID. Next, the host I/O processing program 132B configures "read" to the command type of the disk I/O command being added, configures the disk ID of the disk having the physical area corresponding to the LDEV address to the target disk ID, and configures the address of the disk to the disk address. Note that each of the CM-secured CTL number and the CM address is configured not at this time point but in the CM securing process.

After the CM securing process, the host I/O processing program 132B calls the disk I/O processing program 136B, which then executes a disk read process (S114). Among the disk read commands in the disk I/O interface queue 137B, the disk I/O processing program 136B transmits the disk read command with the CM-secured CTL number corresponding with the number assigned to the associated CTL 110B to the disk designated by the disk read command, and stores data being read in response to the disk read command in the CM area (CM area corresponding to the CM address designated by the disk read command) of the CM 140B of the associated CTL 110B. On the other hand, among the disk read commands in the disk I/O interface queue 137B, the disk I/O processing program 136B (or the host I/O processing program 132B) transmits the disk read command with the CM-secured CTL number not corresponding with the number assigned to the associated CTL 110B to the CM-secured CTL (that is, the CTL 110A). Accordingly, the disk I/O processing program 136A of the CM-secured CTL 110A transmits the disk read command to the disk designated thereby, so that data being read in response to the disk read command is stored in the CM area (CM area corresponding to the CM address designated by the disk read command) of the CM 140A of the receiving CTL 110A. The plurality of disk read commands is transmitted to each of the plurality of disks configuring the RG on which the read source LDEV is based, whereby the read-target host data is created in the CM 140 being the read destination on the basis of a plurality of data that is read from the plurality of disks.

After executing the disk I/O processing, the I/O processing program 132B proceeds to a process in S115.

In S115, the host I/O processing program 132B determines whether or not the read-target host data is stored in the CM 140A of the receiving CTL 110A. The host I/O processing program 132B ends the process when the outcome of the determination in S115 is true (S115: Yes). On the other hand, the host data is copied from the CM 140B of the associated CTL 110B to the CM 140A of the receiving CTL 110A (S116) before the process is ended, when the outcome of the determination in S115 is false (S115: No). The host data may be copied by writing to the CM 140A from the associated CTL 110B or reading from the CM 140B to the CM 140A by the receiving CTL 110A.

Figure 14:
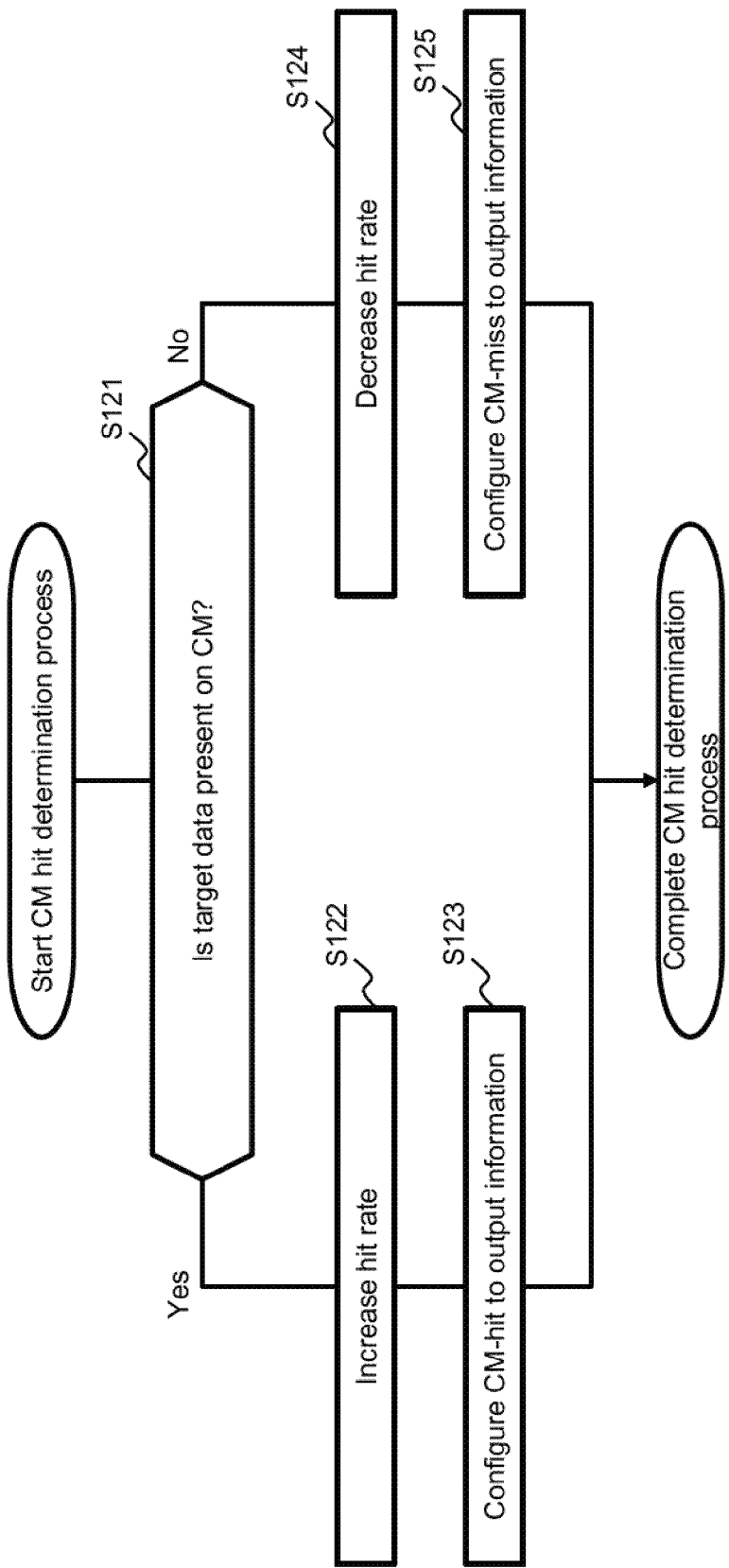
FIG. 14 is a flowchart of a CM hit determination process according to an embodiment.

FIG. 14 is a flowchart of the CM hit determination process (Sill in FIG. 13).

The CM management program 133B determines whether or not the host data targeted by the I/O request is present in the CM 140A or 140B (S121). Specifically, the CM management program 133B determines whether or not there is an entry in the CM area management table 145B, the entry corresponding to the area specified by the LDEV number, the LDEV address, and the length received from the host I/O processing program 132B.

When the outcome of the determination in S121 is true (S121: Yes), the CM management program 133B increases the value of the CM hit rate 704B corresponding to the LDEV number being received (S122), configures "CM hit" to the output information of the CM hit determination process (5123), and returns the output information to the host I/O processing program 132B.

When the outcome of the determination in S121 is false (S121: No), on the other hand, the CM management program 133B decreases the value of the CM hit rate 704B corresponding to the LDEV number being received (S124), configures "CM miss" to the output information of the CM hit determination process (5125), and returns the output information to the host I/O processing program 132B.

Figure 15:
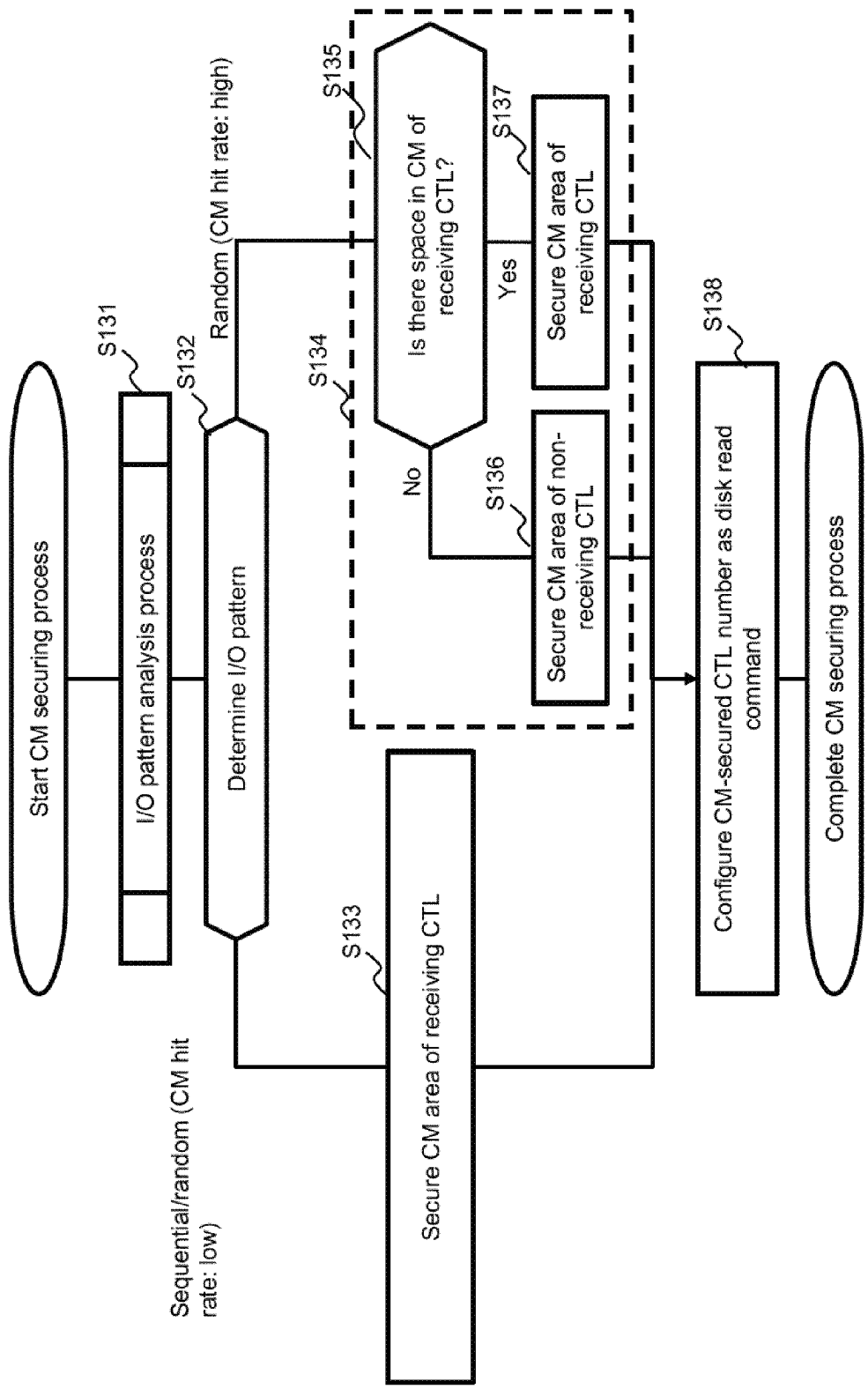
FIG. 15 is a flowchart of a CM securing process according to an embodiment.

FIG. 15 is a flowchart of the CM securing process (S113 in FIG. 13).

The CM management program 133B calls the I/O pattern learning program 134B, which then executes an I/O pattern analysis process (see FIG. 16) (S131).

Upon receiving output information of the I/O pattern analysis process, the CM management program 133 determines the I/O pattern on the basis of the output information (S132). Configured in the output information of the I/O pattern analysis process in the present embodiment is any of "sequential" indicating that the I/O pattern of the read source LDEV is the sequential read, "random (CM hit rate: high)" indicating that the I/O pattern of the read source LDEV is the random read with a high CM hit rate, and "random (CM hit rate: low)" indicating that the I/O pattern of the read source LDEV is the random read with a low CM hit rate. The high/low of the CM hit rate may correspond to whether or not the CM hit rate is equal to or larger than a threshold, for example.

The CM management program 133B causes the data flow optimization program 135B to execute a data flow optimization CM securing process (S133) when the I/O pattern is sequential or random (CM hit rate: low). Here, the data flow optimization CM securing process is a process in which only the CM 140A of the receiving CTL 110A is determined as a cache destination of the host data. This process prevents the host data from being transferred between the CTLs 110, thereby reducing the overhead. The data flow optimization CM securing process is performed when the I/O pattern is sequential, because there is little advantage in caching data in the CM 140B other than the receiving CTL 110A where the data is read sequentially and one can hardly expect the possibility the host data being cached is read by a subsequent read request, in which case it is more effective to prevent the host data from being transferred between the CTLs 110. Moreover, the data flow optimization CM securing process is performed when the I/O pattern is random (CM hit rate: low), because there is little advantage in cashing the data in the CM 140B other than the receiving CTL 110A where there is a low possibility that the CM is hit in a subsequent read request, in which case it is more effective to prevent the host data from being transferred between the CTLs 110.

In order to secure the CM 140A of the receiving CTL 110A as the cache destination of the host data, the data flow optimization program 135B in the data flow optimization CM securing process specifies, from the I/O information storage table 139B, the entry corresponding to the read request targeted for processing, and secures the area in the CM 140A of the CTL 110A corresponding to the receiving CTL number 1106B of the entry as the cache destination of the host data. Note that a clean CM area (CM area in which clean data that is the host data stored in the read source LDEV is stored) with the lowest use frequency may be secured from the CM 140A as the cache destination of the host data newly being read, when there is no vacant CM area in the CM 140A. The CM management program 133B thereafter proceeds to a process in S138.

On the other hand, the CM management program 133B executes a CM hit rate prioritizing CM securing process (S134) when the I/O pattern is random (CM hit rate: high). In the CM hit rate prioritizing CM securing process, the CM 140 to be the cache destination of the host data is not limited to the CM 140A of the receiving CTL 110A in order to improve the CM hit rate. The CM hit rate prioritizing CM securing process can increase the capacity in which the host data can be cached. Here, the CM hit rate prioritizing CM securing process is performed when the I/O pattern is random (CM hit rate: high), because it is more advantageous to improve the CM hit rate by increasing the capacity in which the host data is cached than to prevent the host data from being transferred between the CTLs 110. In other words, there can be an increased number of occasions where the host data is read from the CM 140 without being read from the RG 200 in response to a subsequent read request, whereby one can expect improvement on the overall response to the I/O back to the host computer.

In the CM hit rate prioritizing CM securing process, the CM management program 133B specifies from the I/O information storage table 139B the entry corresponding to the read request targeted for processing, and determines whether or not there is a space in the CM 140A of the receiving CTL 110A corresponding to the receiving CTL number 1106B of the entry (S135). The CM management program 133B secures the CM area of the cache destination preferentially from the CM 140A over the CM 140B (S137) when the outcome of the determination in S135 is true (S135: Yes). Accordingly, one can prevent the host data from being transferred between the CTLs 110 by preferentially determining the CM 140A of the receiving CTL 110A to be the cache destination.

On the other hand, the CM management program 133B secures an area of the CM 140B of the CTL 110B (non-receiving CTL) other than the receiving CTL 110A as the cache destination of the host data (S136), when the outcome of the determination in S135 is false (S135: No).

Upon securing the CM area in S133, S136, or S137, the CM management program 133B configures the number assigned to the CTL 110 including the secured CM area as the CM-secured CTL number of a disk read command corresponding to the read request targeted for processing, and configures the address of the secured CM area as the CM address (S138).

FIG. 16 is a flowchart of the I/O pattern analysis process (S131 in FIG. 15).

The I/O pattern learning program 134B refers to the I/O information storage table 139B and determines whether or not the I/O pattern of the read source LDEV according to the read request targeted for processing is the sequential read by which the area of the LDEV is read sequentially (S141). Specifically, the I/O pattern learning program 134B refers to the I/O information storage table 139B, receives the read request sequentially for a predetermined number of times (such as three times) as the I/O request to the read source LDEV, and determines that the I/O pattern of the read source LDEV is the sequential read when these read requests target sequential LBAs. Note that one can determine whether or not the LBA targeted by the sequential read requests is sequential on the basis of the request LBA and the request length of the sequential read request.

When the outcome of the determination in S141 is true (S141: Yes), the I/O pattern learning program 134B configures "sequential", indicating that the I/O pattern is the sequential read, in the output information of the I/O pattern analysis process (S142) and returns the output information to the CM management program 133B.

When the outcome of the determination in S141 is false, that is, when the I/O pattern is the random read (S141: No), on the other hand, the I/O pattern learning program 134B refers to the LDEV management table 144B and determines whether or not the CM hit rate 704B corresponding to the read source LDEV is equal to or larger than a predetermined threshold (S143).

When the outcome of the determination in S143 is true (S143: Yes), the I/O pattern learning program 134B configures "random (CM hit rate: high)", indicating that the I/O pattern is the random read with a high CM hit rate, in the output information of the I/O pattern analysis process (5144) and returns the output information to the CM management program 133B. When the outcome of the determination in S143 is false (S143: No), on the other hand, the I/O pattern learning program 134B configures "random (CM hit rate: low)", indicating that the I/O pattern is the random read with a low CM hit rate, in the output information of the I/O pattern analysis process (5145) and returns the output information to the CM management program 133B.

While one embodiment has been described, the present invention is not limited to this embodiment, not to mention various modifications can be made without departing from the scope of the invention.

For example, the receiving CTL 110A determines whether or not the read-target host data is stored in the CM 140A without determining whether or not the read source LDEV according to the read request being received is associated with the own CTL. When the outcome of the determination is true, the receiving CTL 110A may read the read-target host data from the CM 140 and transmit a response including the host data to the host computer 10. This makes it possible to respond to the read request without transferring the received I/O request to the associated CTL 110B.

Moreover, in the CM hit rate prioritizing CM securing process (S134 in FIG. 15), an arbitrary method (such as a round robin) may be employed to determine the CM 140 as the cache destination of the host data from among the CM 140 of the plurality of CTLs 110. Once the CM 140 as the cache destination of the host data is determined by the round robin, the amount of host data stored in each CM 140 can be made equal.

REFERENCE SIGNS LIST 10 host computer
100 storage system

The invention claimed is:

1. A storage system which is configured to receive from a host apparatus a read request which is a request to read data from a read source storage area out of a plurality of storage areas, read read-target data according to the read request from the read source storage area, and transmit the read-target data to the host apparatus, the storage system comprising:
   a first storage controller including a first cache memory; and
   a second storage controller including a second cache memory,
   wherein each of the first and second storage controllers is configured to be able to receive the read request from the host apparatus,
   wherein a receiving controller, which is a controller out of the first and second storage controllers, receives the read request,
   wherein an associated controller, which is a controller out of the first and second storage controllers, is associated with the read source storage area,
   wherein when the receiving controller is not the associated controller, the receiving controller is configured to transfer the read request to the associated controller, read the read-target data from a storage device based on the read source storage area, write the read-target data to a cache memory of the receiving controller, and transmit the read-target data written in the cache memory of the receiving controller to the host apparatus,
   wherein the associated controller is configured to determine whether or not a cache destination of the read-target data is limited to the cache memory of the receiving controller based on a history pertaining to a read request made to the read source storage area and received in the past,
   wherein the receiving controller is configured to read the read-target data from the storage device and write the read-target data into the cache memory of the receiving controller when an outcome of the determination is true,
   wherein the outcome of the determination is true when a cache hit rate of the read source storage area is determined to be lower than a predetermined threshold on the basis of the history, and
   wherein the cache hit rate of the read source storage area is a ratio of a number of read requests for which the read-target data is stored in either the first or second cache memory to a number of read requests received for the read source storage area.

2. The storage system according to claim 1,
   wherein the outcome of the determination is true when a read pattern from the read source storage area is determined to be sequential read on the basis of the history.

3. The storage system according to claim 1,
   wherein, when the cache hit rate of the read source storage area is determined to be equal to or larger than the predetermined threshold on the basis of the history, the outcome of the determination is false, and the associated controller is configured to select, from the first and second cache memories, a cache memory serving as a cache destination of the read-target data.

4. The storage system according to claim 3, wherein, when the outcome of the determination is false, the associated controller is configured to preferentially select the cache memory of the receiving controller as the cache destination of the read-target data from the first and second cache memories.

5. The storage system according to claim 1, wherein, when the outcome of the determination is false, the associated controller is configured to select the cache memory serving as the cache destination of the read-target data from the first and second cache memories by a round robin.

6. The storage system according to claim 1, wherein the receiving controller is configured to determine whether or not the read-target data is stored in the cache memory of the receiving controller before determining whether or not the receiving controller is the associated controller and, when an outcome of the determination is true, read the read-target data from the cache memory of the receiving controller without transferring the read request to the associated controller as well as transmit the read-target data to the host apparatus, and transfer the read request to the associated controller when an outcome of the determination is false.

7. The storage system according to claim 1, wherein the associated controller is configured to generate a read command designating the cache memory of the receiving controller as a cache destination and transmit the read command to the receiving controller, while the receiving controller is configured to receive the read command, read the read-target data from a storage device corresponding to the read source storage area in accordance with the read command, and write the read-target data into the cache memory of the receiving controller.

8. A cache control method employed in a storage system which is configured to receive from a host apparatus a read request which is a request to read data from a read source storage area out of a plurality of storage areas, read read-target data according to the read request from the read source storage area, and transmit the read-target data to the host apparatus, the cache control method comprising:

receiving the read request from the host apparatus, by either a first storage controller including a first cache memory or a second storage controller including a second cache memory, wherein a receiving controller, which is a controller out of the first and second storage controllers, receives the read request, and wherein an associated controller, which is a controller out of the first and second storage controllers, is associated with the read source storage area;

when the receiving controller is not the associated controller, transferring, by the receiving controller, the read request to the associated controller, reading, by the receiving controller, the read-target data from a storage device based on the read source storage area, writing, by the receiving controller, the read-target data to a cache memory of the receiving controller, and transmitting, by the receiving controller, the read-target data written in the cache memory of the receiving controller to the host apparatus;

determining, by the associated controller, whether or not a cache destination of the read-target data is limited to the cache memory of the receiving controller based on a history pertaining to a read request made to the read source storage area and received in the past; and reading, by the receiving controller, the read-target data from the storage device and writing, by the receiving controller, the read-target data into the cache memory of the receiving controller when an outcome of the determination is true, wherein the outcome of the determination is true when a cache hit rate of the read source storage area is determined to be lower than a predetermined threshold on the basis of the history, and wherein the cache hit rate of the read source storage area is a ratio of a number of read requests for which the read-target data is stored in either the first or second cache memory to a number of read requests received for the read source storage area.

9. The cache control method according to claim 8, wherein the outcome of the determination is true when a read pattern from the read source storage area is determined to be sequential read on the basis of the history.

10. The cache control method according to claim 8, comprising, when the cache hit rate of the read source storage area is determined to be equal to or larger than the predetermined threshold on the basis of the history, the outcome of the determination is false, and, by the associated controller, selecting from the first and second cache memories, a cache memory serving as a cache destination of the read-target data.

11. The cache control method according to claim 8, comprising, when the outcome of the determination is false, by the associated controller, preferentially selecting the cache memory of the receiving controller as the cache destination of the read-target data from the first and second cache memories.

* * * * *